(12) United States Patent
Pereira et al.

(10) Patent No.: US 9,332,604 B2
(45) Date of Patent: May 3, 2016

(54) LED CONVERTER WITH ADAPTIVE PFC AND RESONANT CONVERTER

(71) Applicant: TRIDONIC GMBH & CO KG, Dornbirn (AT)

(72) Inventors: Eduardo Pereira, Siebnen (CH); Michael Zimmermann, Heiligkreuz (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/367,192

(22) PCT Filed: Dec. 19, 2012

(86) PCT No.: PCT/EP2012/076085
§ 371 (c)(1),
(2) Date: Jun. 19, 2014

(87) PCT Pub. No.: WO2013/092662
PCT Pub. Date: Jun. 27, 2013

(65) Prior Publication Data
US 2015/0002032 A1    Jan. 1, 2015

(30) Foreign Application Priority Data

Dec. 23, 2011 (DE) .......................... 10 2011 089 872

(51) Int. Cl.
*H05B 37/02* (2006.01)
*H05B 33/08* (2006.01)
(52) U.S. Cl.
CPC ........... *H05B 33/0815* (2013.01); *Y02B 20/348* (2013.01)
(58) Field of Classification Search
USPC ............. 315/209 R, 219, 223, 225, 226, 247, 315/276, 291, 307, 308
See application file for complete search history.

(56) References Cited

U.S. PATENT DOCUMENTS

| 8,723,428 B2 * | 5/2014 | Yao .............................. 315/177 |
| 2009/0316454 A1 | 12/2009 | Colbeck et al. |
| 2011/0080102 A1 | 4/2011 | Ge et al. |
| 2013/0134893 A1 | 5/2013 | Zimmermann et al. |
| 2013/0320871 A1 * | 12/2013 | Ge et al. .................. 315/200 R |

FOREIGN PATENT DOCUMENTS

| DE | 102010031233 A1 | 9/2011 |
| DE | 102010031239 A1 | 9/2011 |
| WO | 2008152565 A2 | 12/2008 |

* cited by examiner

*Primary Examiner* — Thuy Vinh Tran
(74) *Attorney, Agent, or Firm* — Volpe and Koenig, P.C.

(57) ABSTRACT

The invention provides an LED converter for operating a load comprising at least one LED series with at least one LED, preferably with multiple LEDs, wherein the LED converter on the primary side comprises a resonant converter supplied with a direct current voltage. Said converter has a half-bridge constructed of two reciprocally clocked switches and providing a supply voltage for the LED series through a serial/parallel resonance circuit connected to the midpoint of said bridge. The LED converter has a control unit that is arranged for adjusting the clocking frequency of the half bridge. To control or regulate the power transferred by the LED converter to the LED series, the control unit is arranged to vary the frequency of the clocking in a frequency corridor that is delimited on at least one side, and to vary the amplitude of the direct current voltage supplying the resonant converter if a change of the load and/or the change of a setpoint value for the power would lead to a frequency operating point outside the frequency corridor.

24 Claims, 7 Drawing Sheets

LED CONVERTER WITH ADAPTIVE PFC AND RESONANT CONVERTER

FIELD OF THE INVENTION

The present invention generally relates to the operation of light-emitting diodes (LEDs), wherein light-emitting diodes are understood to mean inorganic light-emitting diodes, but also organic light-emitting diodes (OLEDs). The term LED will be used here representatively.

BACKGROUND

It is known that the light emission or the brightness of an LED correlates with the current flow through the LED. For brightness regulation (dimming), LEDs are therefore preferably operated in a mode in which the current flow through the LED is regulated.

In principle, it is already known to supply electric power to an LED string, which can have one or more LEDs connected in series, from a constant current source. It is likewise known to use pulse width modulation (PWM) to implement dimming, with the result that constant current regulation can be implemented on the on times of a PWM pulse train. During dimming, the duty factor of the PWM signal is then varied.

In order to provide the supply voltage of the constant current source, an actively clocked PFC (Power Factor Correction) circuit can be used, for example.

Finally, yet further requirements also need to be taken into consideration in the operation of LEDs. For example, galvanic isolation between the LED string and the supply voltage of the PFC, typically a mains voltage, is generally required.

These requirements are provided, for example, by an LED converter with a clocked constant current source, as is known from DE 10 2010 031239 A1, for example. The clocked constant current source described therein can also be in the form of a flyback converter.

LED converters are also known which can supply a variable load, i.e. a different, variable number of LEDs or LEDs of different types in the LED string. In particular for this reason, the use of flyback converters, for example, is preferred since this type of converter can be set relatively flexibly and, with such converters, it is possible for there to be an effective response to a change in the load operated by the LED converter (caused by adding or removing LEDs and/or by a change in temperature, for example).

In this case, for example, the number of LEDs can vary between 1 and 16. Thus, the LED converter needs to be capable, for example, of providing an output voltage of 3 volts for a (single) LED, for example, whereas it needs to provide an output voltage of 48 volts for, for example, 16 LEDs connected in series.

In particular when using a flyback converter, the amount of energy which can be transmitted by said flyback converter is limited, however, since the component parts, in particular the primary-side winding, cannot be enlarged to an unlimited extent.

A further problem with the flyback converter consists in that a control circuit for controlling or regulating the switch of the flyback converter is provided on the primary side. In order that the control circuit can implement the control or regulation, typically measurement signal feedback from the secondary side of the flyback converter to the control circuit takes place, wherein this feedback likewise needs to take place with galvanic isolation in order to maintain the galvanic isolation.

In order to achieve this, an optocoupler is used, for example, which makes it possible to feed back the measurement signal with galvanic isolation. The use of an optocoupler results in relatively high costs in comparison with the total costs of the circuit, however. Furthermore, the life and also the stability over time of the optocoupler are limited.

Furthermore, resonant converters have long been known, for example, from the field of ballasts for fluorescent lamps. In this field, resonant converters are used, for example, to generate a high voltage necessary for operation of a fluorescent lamp.

The resonant converter ("LLC resonant converter") is in particular a form of DC-to-DC converter which operates with a resonant circuit for energy transmission. The resonant converter in this case converts a DC voltage into a single-phase or polyphase AC voltage and is typically operated on an approximately constant load for optimum operation. Resonant converters operate during constant operation (i.e. during operation on a constant load) at a predefined frequency working point on the resonance curve.

One disadvantage, however, consists in that in the event of a change in load owing to a variation of the LED string (different LEDs or a different number of LEDs in the series circuit of LEDs), the frequency working point on a resonance curve also shifts and the resonant converter therefore no longer operates in optimum fashion.

Figure 1:
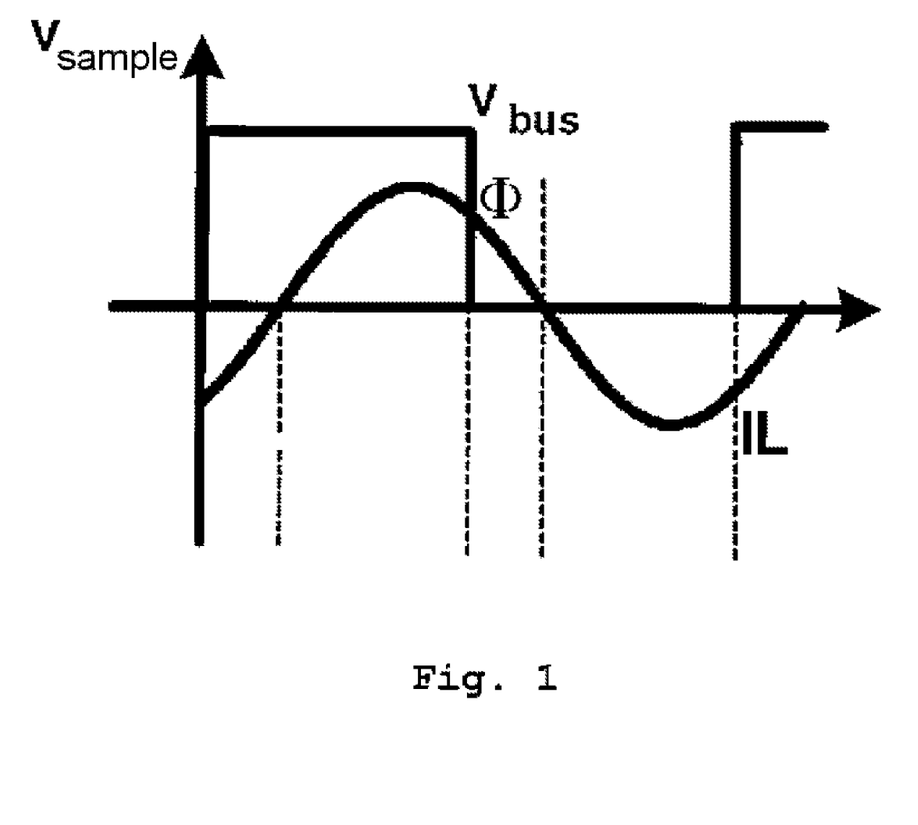
FIG. 1 shows, schematically, a relationship between a bus voltage, an LED current and a phase angle.

However, this means that not only the voltage gain, i.e. the ratio of bus voltage to output voltage, varies, but also the phase angle $\Theta$ (angle between the current IL and the voltage $V_{bus}$, as illustrated in FIG. 1) varies.

Therefore, a reactive range may result, i.e. an increase in the reactive current caused by a phase shift, in which range the efficiency of the resonant converter decreases.

Therefore, the frequency working point for the resonant converter when using 16 LEDs, for example, is very much closer to a resonance peak than when using only one LED, in which case the frequency working point is shifted considerably upwards, i.e. away from the resonance peak. Thus, the efficiency during operation with one LED is markedly reduced.

The invention therefore addresses the problem of providing an LED converter which is embodied with a resonant converter and which enables a variable and flexible operation in the case of a varying load. At the same time, signal feedback which takes place with galvanic isolation will be dispensed with.

SUMMARY

The invention solves this problem by means of an apparatus, a method and an integrated circuit as claimed in the independent claims. Further advantageous configurations of the invention are the subject matter of the dependent claims.

The invention provides an LED converter for operating a load comprising at least one LED string having at least one LED, preferably having a plurality of LEDs, wherein the LED converter comprises, on the primary side, a resonant converter to which a DC voltage is supplied, and which has a half-bridge formed with two alternately clocked switches, which half-bridge provides a supply voltage for the LED string via a series/parallel resonant circuit connected to the center point of said half-bridge, wherein the LED converter has a control unit, which is configured to set the frequency of the clocking of the half-bridge, and wherein the control unit is configured, to control or regulate the power transmitted by the LED converter to the LED string, to vary the frequency of the clocking in a frequency corridor which is limited on at least one side, and to vary the amplitude of the DC voltage supplying the resonant converter if a change in the load and/or the variation of a setpoint value for the power would result in a frequency working point outside of the frequency corridor.

The control unit can determine a feedback variable, in particular an actual value, in the resonant converter and set the frequency of the clocking on the basis of the feedback variable, wherein the feedback variable can be a variable which reflects the power transmitted by the resonant converter. The feedback variable can in particular be a current/voltage in the resonant converter or an electrical parameter reflecting said current/voltage.

When the LED converter is switched on, in particular when a mains voltage is applied, the control unit can set the frequency of the clocking in such a way that the frequency working point is in the frequency corridor. Whether the frequency working point is in the frequency corridor can be determined via the feedback variable. The control unit can at the same time set the DC voltage supplying the resonant converter to a DC voltage which is as low as possible, in particular with low amplitude.

The control unit can gradually increase the DC voltage supplying the resonant converter until a threshold value for the feedback variable has been reached.

The control unit can keep the DC voltage supplying the resonant converter constant when the threshold value has been reached.

The control unit can implement runtime control and determine the feedback variable during the runtime control. The control unit can identify, on the basis of the feedback variable, whether the frequency working point is in the frequency corridor.

The control unit can adjust the DC voltage supplying the resonant converter when the check in respect of the feedback variable during the runtime control establishes that the frequency working point is outside the frequency corridor and/or would leave the frequency corridor.

The control unit can implement the runtime control once the threshold value has been reached.

The control unit can set the DC voltage supplying the resonant converter by driving a switch of a PFC circuit.

The control unit can communicate a setpoint value for the DC voltage supplying the resonant converter to a PFC circuit.

A change in the load can result from a change in the number and/or the type of the operated LEDs in the LED string and/or from a change in temperature.

The series/parallel resonant circuit can supply a transformer, which provides, at its output on the secondary side, the supply voltage for the LED string.

A diode circuit can be provided on the secondary side, preferably at an output of the transformer, which diode circuit feeds a storage capacitor, which provides the supply voltage for the LED string.

In a further aspect, the invention provides a method for operating an LED converter for operating a load comprising at least one LED string having at least one LED, preferably having a plurality of LEDs, wherein the LED converter comprises, on the primary side, a resonant converter to which a DC voltage is supplied, and which has a half-bridge formed with two alternately clocked switches, which half-bridge provides a supply voltage for the LED string via a series/parallel resonant circuit connected to the center point of said half-bridge, wherein the LED converter has a control unit, which sets the frequency of the clocking of the half-bridge, and wherein the control unit, for controlling or regulating the power transmitted by the LED converter to the LED string, varies the frequency of the clocking in a frequency corridor which is limited on at least one side, and varies the amplitude of the DC voltage supplying the resonant converter if a change in the load and/or the variation of a setpoint value for the power would result in a frequency working point outside the frequency corridor.

Finally, in yet a further aspect, the invention provides an integrated circuit, preferably a microcontroller and/or an application-specific integrated circuit (ASIC) or a combination thereof, which is configured and/or programmed to implement a method, as has been described above.

BRIEF DESCRIPTION OF THE DRAWINGS

The invention will now be described below also with reference to the drawings, in which.

DETAILED DESCRIPTION OF THE PREFERRED EMBODIMENTS

Figure 2:
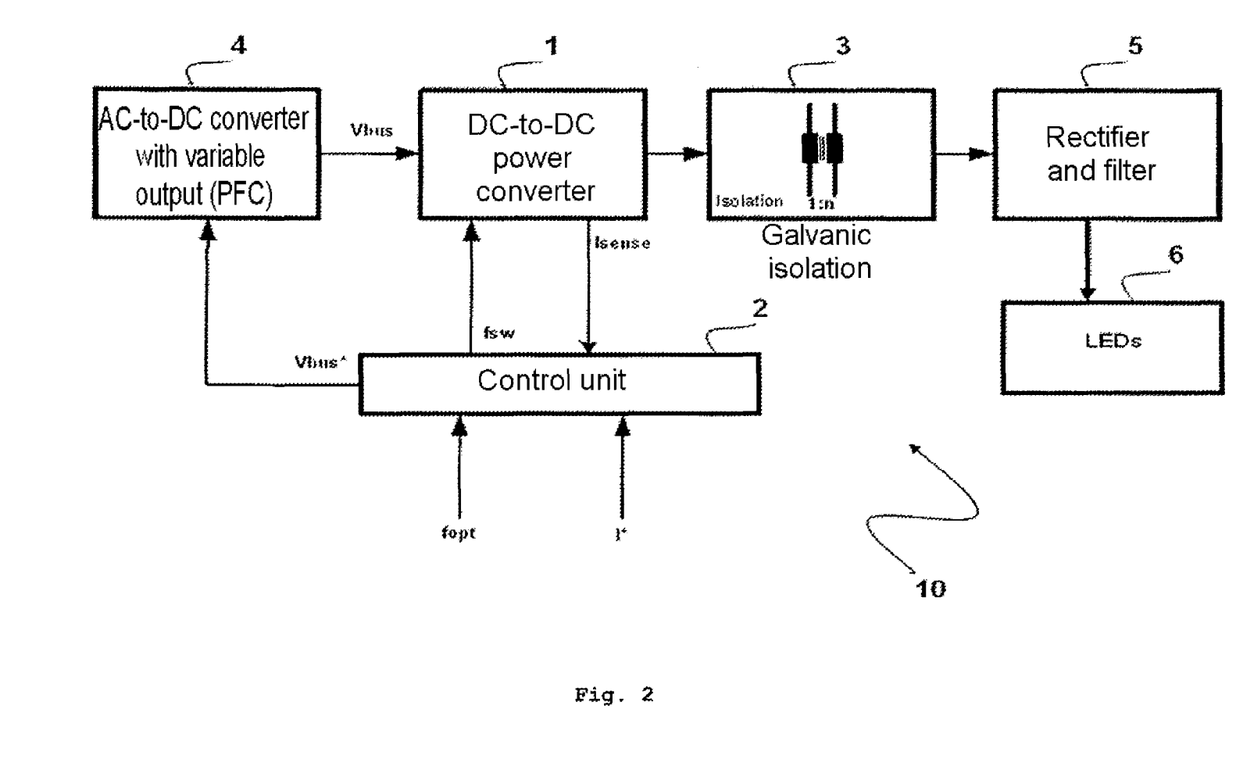
FIG. 2 shows a block circuit diagram of an LED converter in accordance with the invention.

The invention will now be described first in respect of FIG. 2, which shows a block circuit diagram for an LED converter 10 according to the invention. The invention solves the above-mentioned problem in particular in that the frequency working point of the resonant converter 1 on the resonance curve is restricted to a range, in particular a frequency corridor $f_{opt}$ which is limited on at least one side, and in which the efficiency of the resonant converter is high. This frequency corridor $f_{opt}$ is stored in a control unit 2 in advance, preferably in the factory.

In accordance with one exemplary embodiment, therefore, variations in the working frequency of the resonant converter 1 are possible within this frequency corridor $f_{opt}$. The frequency $f_{sw}$ at which the resonant converter 1 operates or is operated is therefore not entirely fixed. As a result, sufficient adaptivity of the resonant converter 1 to different loads (for example different types and/or different numbers of LEDs) in an LED string 6 can be permitted.

In order to make this adaptivity of the resonant converter 1 possible, the DC voltage supplying the resonant converter 1 or the bus voltage $V_{bus}$ (DC voltage) is varied in order to adjust to the load when the frequency working point moves outside of the limits of the frequency corridor, i.e. if the working frequency of the resonant converter 1 were to be outside the frequency corridor which is limited on at least one side, owing to calibration using the feedback variable.

In accordance with the invention, therefore, the control unit 2 is configured to regulate/control the regulated/controlled working frequency for the resonant converter. Preferably, in this case the control unit 2 detects, as feedback variable, the current $I_{sense}$ through the resonant converter 1. This is shown schematically in FIG. 2. In addition, FIG. 2 shows galvanic isolation 3 downstream of the resonant converter 1. The control unit 2 sets and/or regulates furthermore the bus voltage $V_{bus}$, for example by means of a drive signal $V_{bus*}$ for an AC-to-DC converter with a variable output or for a switch of the PFC circuit 4.

It is of course also possible for the control unit 2 to preset a setpoint value to the PFC circuit 4, to which setpoint value the PFC circuit 4 sets the bus voltage/DC voltage $V_{bus}$. This is in particular the case when the bus voltage $V_{bus}$ is not fed back to the control unit 2, but regulation for the bus voltage $V_{bus}$ is already provided in the PFC circuit 4 itself.

In addition to the frequency corridor $f_{opt}$, in this case also a dimming setpoint value I* or alternatively or additionally possibly also a fixed working point for a working frequency of the resonant converter 1 can be preset to the control unit 2.

If a dimming signal I* now enters with which the control unit 2 would need to set a working frequency of the resonant converter 1 which is outside the preset optimum frequency corridor $f_{opt}$, the control unit 2 will vary the setpoint value $V_{bus*}$ for the PFC circuit 4 (for example an actively clocked PFC), with the result that the bus voltage $V_{bus}$ supplying the resonant converter 1 is varied, in particular reduced.

The control unit 2 controls/regulates in this case in particular the frequency $f_{sw}$ for the clocking of a half-bridge of the resonant converter 1 in order to set the working frequency of the resonant converter 1.

On the basis of FIG. 3, an exemplary embodiment of a circuit arrangement for an LED converter 10' in accordance with the invention will now be described.

Figure 3:
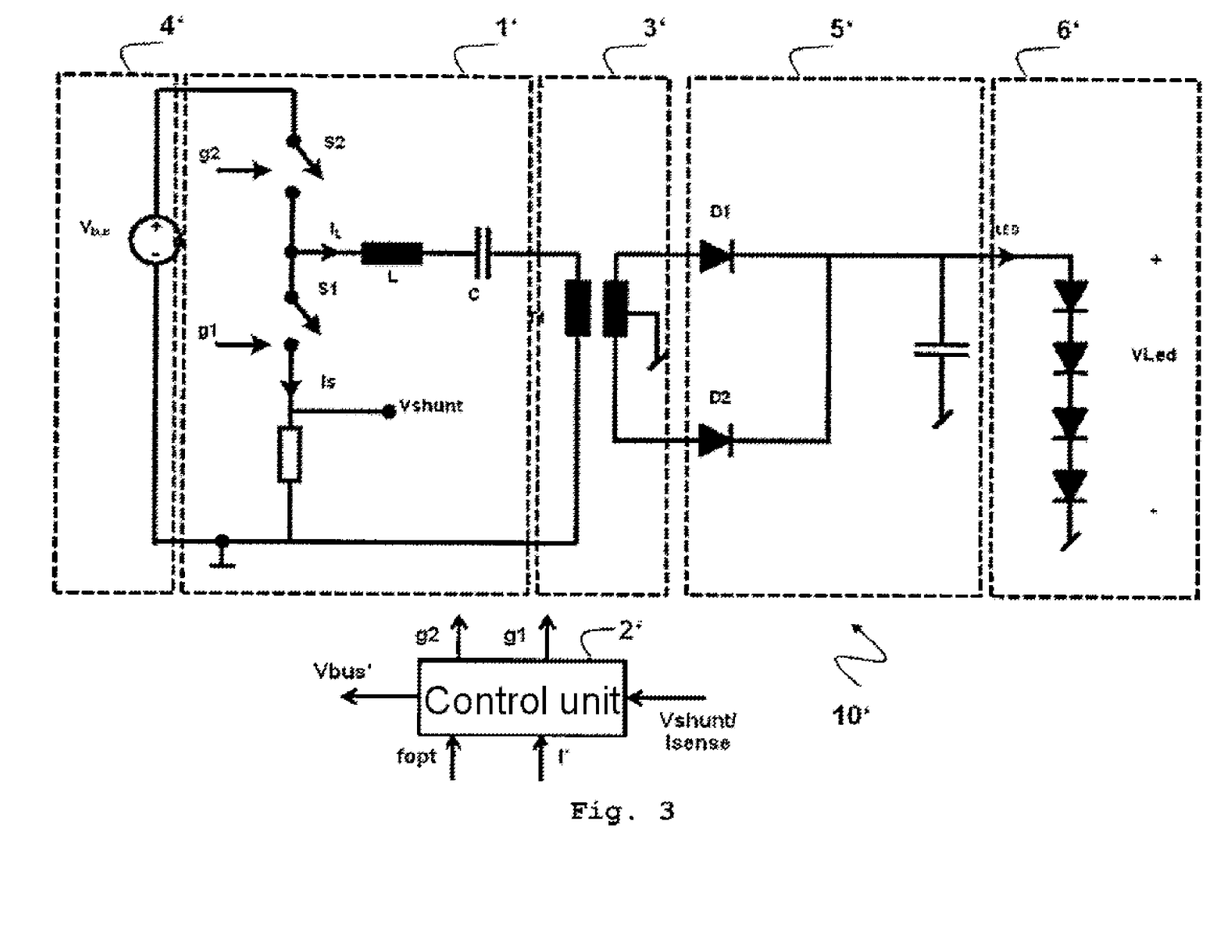
FIG. 3 shows, schematically, an exemplary embodiment of an LED converter in accordance with the invention.

In addition to the bus voltage $V_{bus}$ (block 4'), FIG. 3 shows a resonant converter 1' which has a half-bridge formed with two alternately clocked switches S1, S2, to which half-bridge the bus voltage $V_{bus}$ is supplied. The switches S1, S2 are in particular field-effect transistors (FETs), for example MOSFETs. The switches S1, S2 are in this case driven by a control unit 2' via in each case one gate connection g1, g2.

A series resonant circuit (alternatively a parallel resonant circuit) comprising an inductance L and a capacitance C is connected to the center point of the half-bridge, wherein this series resonant circuit in turn supplies a transformer 3' (transformer T1 for galvanic isolation).

The figure shows a diode circuit on the secondary side at the output of the transformer, which diode circuit feeds a storage capacitor (ELCO). This arrangement corresponds to the "rectifier and filter" block 5 shown in FIG. 2. The DC voltage at the storage capacitor in turn supplies an LED string 6'.

The switches S1 and S2 are in this case ideally driven by the control unit 2' in such a way that they are turned on alternately for the duration of a half-period of the resonant frequency of the inductance L and the capacitance C.

For this purpose, the control unit 2' preferably generates two square-wave voltages, each having an on time of 45%, for example, wherein care should be taken to ensure that there are no overlaps. In order to regulate the resonant converter, only the respective frequency $f_{sw}$ needs to be regulated by the control unit 2', therefore, for driving the switches S1, S2, or the dead time needs to be correspondingly lengthened or shortened.

On full load, the switches S1, S2 therefore have only a short dead time and are driven in push-pull mode preferably at the resonant frequency of the series resonant circuit.

Correspondingly, a virtually sinusoidal voltage characteristic is set at the storage capacitor. The primary-side voltage can in this case be approximately half the bus voltage $V_{bus}$. Since the switches S1, S2 can each be switched on for the duration of a half-period preferably of the resonant frequency of the series resonant circuit, the current in the resonant circuit during switch-on and switch-off is always precisely at the zero crossing, for example, which results in low switching losses.

If the intention is for the power of the resonant converter to be reduced, the switching frequency can be reduced with a constant on time. In principle, the series resonant circuit is then still at resonance, for example, but then the oscillation is maintained for the duration of the dead time, during which time both switches S1, S2 are off, and then continued at the same point at the end of the dead time.

The voltage characteristic at the storage capacitor can therefore be virtually frozen at the crest value for the duration of the dead time, wherein the storage capacitor can store the charge up until the end of the dead time. The switching frequency of the resonant converter can then be reduced down to 0 Hz, for example, on a low load.

Returning to FIG. 2, the control unit 2 is therefore in particular configured to implement a regulation method/control in respect of the frequency $f_{sw}$ of the resonant converter 2 and the bus voltage $V_{bus}$, as is described below.

Figure 4:
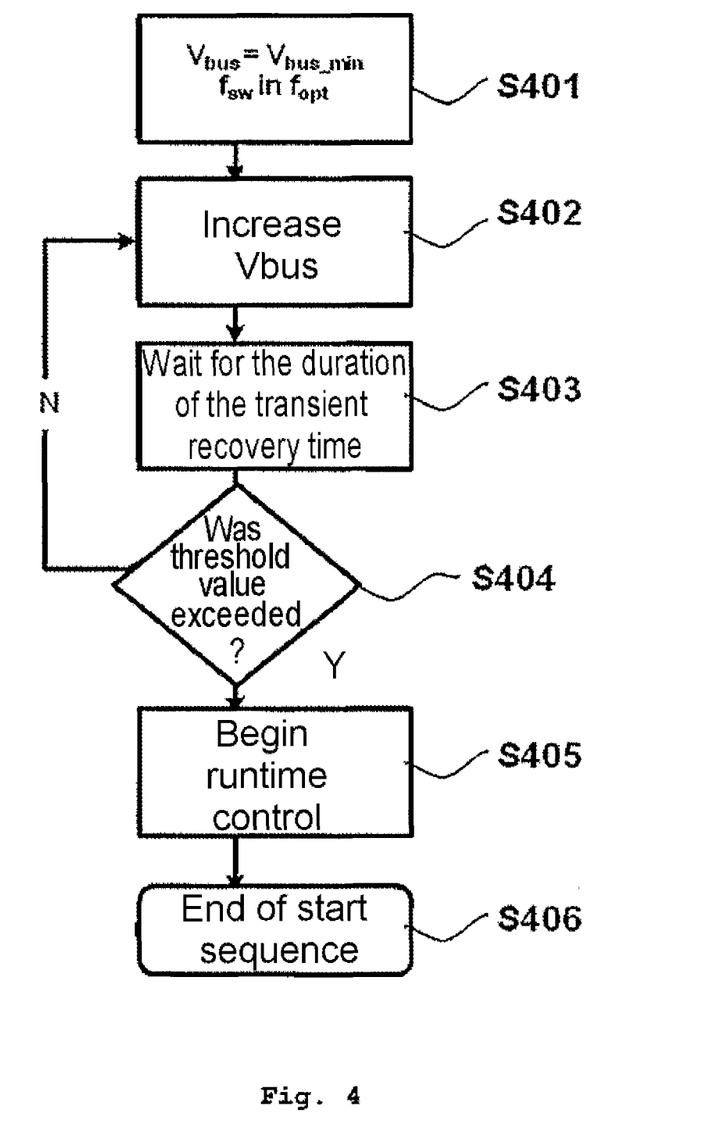
FIG. 4 shows a flow chart for a start sequence, as is implemented by a control unit in accordance with the invention.

In this case, reference is now also made to FIGS. 1 and 4, which describe part of the method according to the invention.

Since it is not yet known when the LED converter 10 is switched on how great the load on the LED string 6 is, i.e. in particular it is not known what type and/or what number of LEDs is connected, the control unit 2 first implements a start sequence.

In the start sequence (step S401), therefore, the resonant converter 1 is operated by the control unit 2 first at a frequency $f_{sw}$ such that the frequency working point is in the predetermined frequency corridor $f_{opt}$, in particular at a specific working point on the resonance curve. In this case, the bus voltage $V_{bus}$ which supplies the resonant converter 1 is kept as low as possible.

Starting from the minimum value for the bus voltage, the bus voltage $V_{bus}$ is then gradually increased (steps S402 to S404), while at the same time the feedback variable, for example the current $I_{sense}$, is measured and/or detected by the control unit 2.

The feedback variable is preferably determined at a shunt between ground and the low-potential switch (the switch S1 in FIG. 3) of the half-bridge of the resonant converter 1. Alternatively or in addition, a voltage $V_{shunt}$ can also be detected by the control unit 2 as feedback variable at the shunt.

First, there may be a wait for the duration of a transient recovery time between a change in the bus voltage $V_{bus}$ and repeated checking or repeated sampling of the feedback variable (step S403).

If the feedback variable (for example a peak value Max of the current through the lower-potential switch of the half-bridge, generally a peak value Max for the feedback variable which is detected for the resonant converter 1) reaches a setpoint value ref (step S404), the bus voltage is not increased any further. The control unit 2 then changes to a mode for runtime control of the resonant converter (step S405) and the start sequence is then ended (step S406). Otherwise, the method returns to step S402 and increases the bus voltage $V_{bus}$ again.

The bus voltage is naturally only kept fixed as long as the frequency $f_{sw}$ of the resonant converter is within the frequency corridor $f_{opt}$.

Preferably, the start sequence is performed every time the mains voltage is newly applied to the LED converter 10.

The feedback variable, which, as has been mentioned, is a peak value Max for the feedback variable at the shunt, for example, is in this case only an example of a possible variable which reflects the power transmitted by the resonant converter 1. A conclusion can also be drawn in respect of the instantaneous working point from this feedback variable and, correspondingly, the frequency $f_{sw}$ can be set by the control unit 2.

Alternatively, other feedback variables detected on the primary side or secondary side can also be used. As already described, in the case of the feedback of secondary-side feedback variables, additional galvanic isolation, for example by means of an optocoupler, is necessary, which, as mentioned already above, results in elevated costs for the circuit and is therefore not preferable in this case.

For example, the permitted working point range, or the frequency corridor $f_{opt}$ which is limited on at least one side, could be in a range of from 80 kHz±10 kHz at a working frequency of, for example, 80 kHz for the primary-side clocking of the resonant converter 1. The range can, however, also be approximately ±20%, preferably ±15%, about an optimum working frequency and determine the at least single-sided frequency corridor $f_{opt}$.

Figure 5:
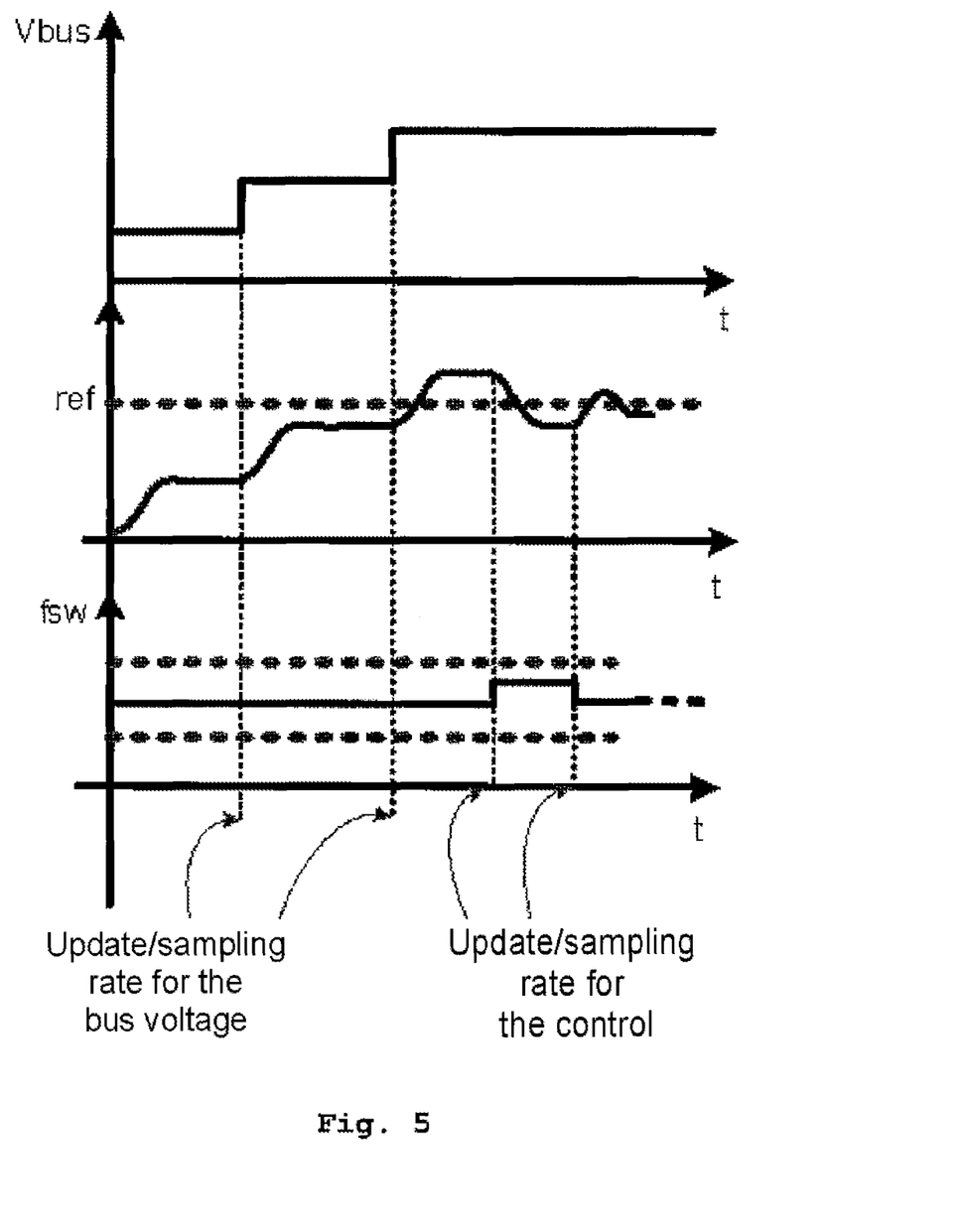
FIG. 5 shows, schematically, a relationship between sampling of a feedback variable in the resonant converter and a variation of the mains voltage and a frequency of the clocking of the half-bridge of the resonant converter.

The effects of the start sequence on various variables of the LED converter 10 are shown schematically in FIG. 5. In this case, FIG. 5 shows, at the top, the characteristic of the bus voltage $V_{bus}$, while values for the feedback variable detected by the control unit 2 are plotted in the center in FIG. 5, and likewise the threshold value ref is illustrated (dashed line).

If the threshold value ref for the feedback variable has been exceeded owing to the gradual increase in the bus voltage $V_{bus}$, it is possible, as shown at the bottom in FIG. 5, for the frequency $f_{sw}$ for the clocking of the switches of the half-bridge to be temporarily increased for a short period of time until the detected feedback variable is again below the threshold value ref.

In addition, FIG. 5 shows firstly a sampling rate for the feedback variable, on the basis of which the bus voltage $V_{bus}$ is adjusted, and secondly the sampling rate of the feedback variable on the basis of which the frequency $f_{sw}$ for the clocking of the switches of the half-bridge of the resonant converter 1 takes place in order to keep the frequency working point within the frequency corridor $f_{opt}$. The frequency corridor $f_{opt}$ is illustrated at the bottom of FIG. 5 by dashed lines.

Figure 6:
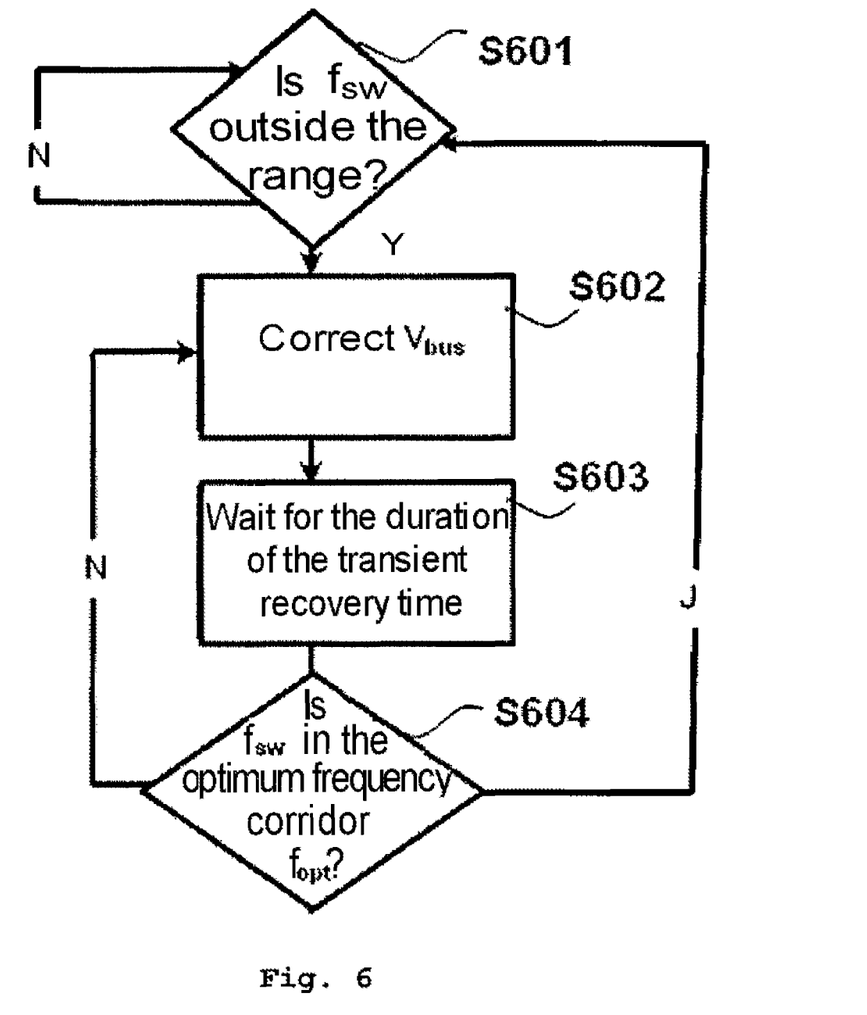
FIG. 6 shows a flow chart for runtime control/regulation, as is implemented by a control unit in accordance with the invention.

The method according to the invention for runtime control/regulation is shown in FIG. 6. In this case, checks are continually performed to ascertain whether the frequency $f_{sw}$ for the clocking of the switches of the half-bridge of the resonant converter 2 is outside the frequency corridor $f_{opt}$ (step S601), i.e. whether the frequency $f_{sw}$ needs to be varied owing to the detected feedback variable in order to keep the frequency working point in the frequency corridor.

If this is not the case, the bus voltage $V_{bus}$ is corrected (see step S602). After a potential wait for the duration of a transient recovery time (step S603), a check is again performed to ascertain whether operation in the optimum frequency corridor $f_{opt}$ (frequency band) is taking place in respect of the frequency $f_{sw}$ for the clocking of the switches of the half-bridge (step S604). If the frequency $f_{sw}$ for the clocking of the switches, and therefore the frequency working point, is in the frequency corridor $f_{opt}$, the control unit 2 returns to the runtime correction mode (step S601).

If the frequency $f_{sw}$ for the clocking of the switches of the resonant converter 1 is outside the frequency corridor $f_{opt}$, the control unit returns to step S602, in which the bus voltage $V_{bus}$ is corrected. Therefore, the runtime control regulates/controls the bus voltage $V_{bus}$, with the result that the working frequency $f_{sw}$ for the clocking of the switches of the resonant converter 1 is kept within the frequency corridor $f_{opt}$.

A control unit 2" can in particular detect a peak value Max for the feedback variable. This will now be described with reference to FIG. 7.

In this regard, the feedback variable (voltage/current at the measuring resistor/shunt) is first digitized by an analog-to-digital converter (A/D converter). Then, the feedback variable, for example the voltage $V_{shunt}$, is sampled and the respectively higher sampled value is stored (held). This is also known as "sample and hold" (in FIG. 7).

In synchronism with the circuit of the lower-potential switch of the half-bridge of the resonant converter 1 (switch S1 in FIG. 3), the previously detected peak value Max for the feedback variable is reset by the control unit 2". Thus, peak value detection for the feedback variable for each on time of the lower-potential switch of the half-bridge takes place.

Figure 7:
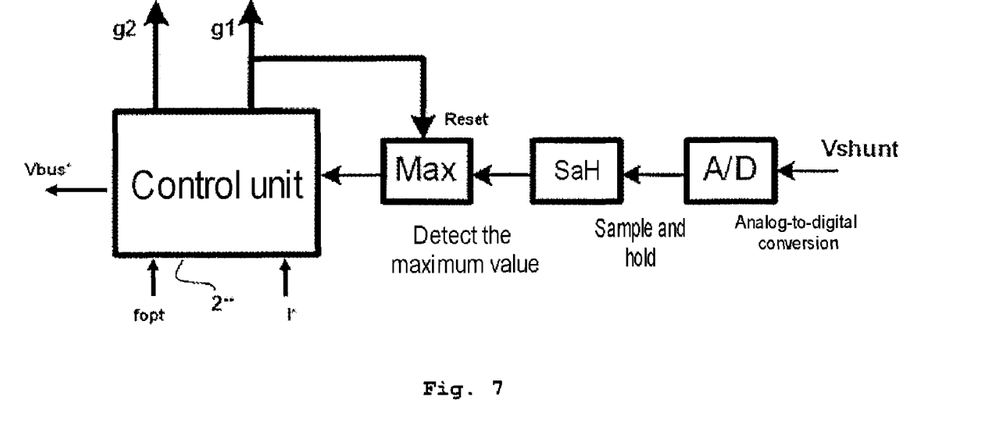
FIG. 7 shows, schematically, a method according to the invention for determining a peak value for the feedback variable.

This type of current detection can then also be evaluated for fault detection on the secondary side (for example for detecting a short-circuit state).

In the case of such a fault state, the value for the feedback variable varies impermissibly, for example increases/drops to above/below a limit value. For example, the current $I_{sense}$ detected on the primary side can increase to an impermissibly high level.

If such a fault state is identified, the control unit 2, 2', 2" can take measures to prevent destruction of the resonant converter 1, 1'. These measures can consist, for example, in a variation of the clocking or the duty factor of the half-bridge and/or the frequency $f_{sw}$ of the half-bridge can be varied in order to reduce the transmitted power. Alternatively or in addition, complete disconnection of the LED converter 10, 10' by the control unit 2, 2', 2" is also possible.

The advantage of detecting the peak value Max consists in that the control unit 2, 2', 2" varies the bus voltage $V_{bus}$ directly on the basis of the present peak value for the feedback variable without integration or averaging needing to be performed by the control unit 2, 2', 2", and can also draw a direct conclusion on the power transmitted by the resonant converter.

However, it is important that preferably this peak value Max is used without further combination with other electrical variables, in particular without multiplication by the bus voltage $V_{bus}$, for example, as feedback variable for the control/regulation of the power transmitted by the resonant converter 1, 1'. As mentioned, the controlled variable is, for example, the switching frequency of the switches of the half-bridge of the resonant converter.

It should be understood here that the above-described method and method steps can also be implemented by an integrated circuit, in particular by a microcontroller or an ASIC or a combination of the two.

The invention can therefore provide an LED converter for operating a load comprising at least one LED string having at least one LED, preferably having a plurality of LEDs, wherein the LED converter comprises, on the primary side, a resonant converter to which a DC voltage is supplied, and which has a half-bridge formed with two alternately clocked switches, which half-bridge provides a supply voltage for the LED string via a series/parallel resonant circuit connected to the center point of said half-bridge, wherein a control unit is configured, to regulate the power transmitted by the LED converter to the LED string, to determine directly or indirectly a peak value of the current through the lower-potential switch of the half-bridge, as actual value variable fed back in each switch-on cycle, and to set, as controlled variable, the clocking, i.e. the frequency and/or the duty factor, of the half-bridge.

The control unit can determine the peak value by sampling a voltage/current at a measuring resistor. The control unit can store a higher value detected in each case by the sampling, the instantaneous peak value.

The control unit can reset a stored value in synchronism with the circuit of the lower-potential switch of the half-bridge.

The control unit can identify a secondary-side fault state, in particular a short circuit, when the detected peak value reaches a threshold value.

In the event of identification of a fault state, the control unit can vary the frequency of the clocking and/or a duty factor of the half-bridge and thus reduce the transmitted power and/or can disconnect the LED converter.

In a further aspect, the invention can provide a method for operating an LED converter for operating a load comprising at least one LED string having at least one LED, preferably having a plurality of LEDs, wherein the LED converter comprises, on the primary side, a resonant converter to which a DC voltage is supplied, and which has a half-bridge formed with two alternately clocked switches, which half-bridge provides a supply voltage for the LED string via a series/parallel resonant circuit connected to the center point of said half-bridge, wherein a control unit, for regulating the power transmitted by the LED converter to the LED string, determines directly or indirectly the peak value of the current through the lower-potential switch of the half-bridge as actual value variable which is fed back in each switch-on cycle of the lower-potential switch and sets, as controlled variable, the clocking, i.e. the frequency and/or the duty factor, of the half-bridge.

What is claimed is:

1. An LED converter (10) for operating a load comprising at least one LED string (6) having a plurality of LEDs, wherein
    the LED converter (10) comprises, on the primary side, a resonant converter (1) to which a DC voltage ($V_{bus}$) is supplied,
    the LED converter (10) further comprises a half-bridge formed with two alternately clocked switches (S1, S2), which half-bridge provides a supply voltage for the LED string (6) via a series or parallel resonant circuit connected to a center point of said half-bridge,
    wherein the LED converter (10) has a control unit (2), which is configured to control or regulate the power transmitted by the LED converter (10) to the LED string (6), to vary a frequency ($f_{sw}$) of the clocking in a frequency corridor ($f_{opt}$) that is delimited on at least one side, and to vary the amplitude of the DC voltage ($V_{bus}$) supplying the resonant converter (1) if at least one of: a change in the load or if a variation of a setpoint value for the power (I*) would result in a frequency working point outside of the frequency corridor ($f_{opt}$) and wherein the control unit (2) is configured to determine a feedback variable in the resonant converter (1) and to set the frequency (fsw) of the clocking on the basis of the feedback variable, wherein the feedback variable is a variable which reflects the power transmitted by the resonant converter (1), and wherein the feedback variable is a ratio of a current (Isense) through the resonant converter to a voltage (Vshunt) in the resonant converter (1) or an electrical parameter reflecting said current to voltage ratio.

2. The LED converter as claimed in claim 1, wherein the control unit (2) is configured to set the frequency ($f_{sw}$) of the clocking when the LED converter (10) is switched on in such a way that the frequency working point is in the frequency corridor ($f_{opt}$) and at the same time to set the DC voltage ($V_{bus}$) supplying the resonant converter (1) to a DC voltage which is lower than a threshold value (ref).

3. The LED converter as claimed in claim 1, wherein the control unit is configured to gradually increase the DC voltage ($V_{bus}$) supplying the resonant converter (1) until a threshold value (ref) for the feedback variable has been reached.

4. The LED converter as claimed in claim 3, wherein the control unit (2) is configured to keep the DC voltage ($V_{bus}$) supplying the resonant converter (1) constant when the threshold value (ref) has been reached.

5. The LED converter as claimed in claim 3, wherein the control unit (2) is configured to implement the runtime control once the threshold value (ref) has been reached.

6. The LED converter as claimed in claim 1, wherein the control unit (2) is configured to implement runtime control, to determine the feedback variable during the runtime control, and to identify, on the basis of the feedback variable, whether the frequency working point is in the frequency corridor ($f_{opt}$).

7. The LED converter as claimed in claim 6, wherein the control unit (2) is configured to adjust the DC voltage ($V_{bus}$) supplying the resonant converter (1) when the check in respect of the feedback variable during the runtime control establishes that the frequency working point is at least one of: outside the frequency corridor ($f_{opt}$) or would leave the frequency corridor.

8. The LED converter as claimed in claim 1, wherein the control unit (2) is configured to set the DC voltage ($V_{bus}$) supplying the resonant converter (1) by driving a switch of a PFC circuit (4).

9. The LED converter as claimed in claim 1, wherein the control unit (2) is configured to communicate a setpoint value ($V_{bus*}$) for the DC voltage ($V_{bus}$) supplying the resonant converter (1) to a PFC circuit (4).

10. The LED converter as claimed in claim 1, wherein a change in the load results from: a change in number; a type of the operated LEDs in the LED string (6); a change in temperature or combinations thereof.

11. The LED converter as claimed in claim 1, wherein the series/parallel resonant circuit is configured to supply a transformer (3), which provides, at its output on the secondary side, the supply voltage for the LED string (6).

12. The LED converter as claimed in claim 1, wherein a diode circuit is provided on the secondary side, said diode circuit feeds a storage capacitor (5), which is configured to provide the supply voltage for the LED string (6).

13. A method for operating an LED converter (10) for operating a load comprising at least one LED string (6) having a plurality of LEDs, wherein
    the LED converter (10) comprises, on the primary side, a resonant converter (1) to which a DC voltage ($V_{bus}$) is supplied,
    the LED converter (10) further comprises a half-bridge formed with two alternately clocked switches (S1, S2), said half-bridge provides a supply voltage for the LED string (6) via a series or parallel resonant circuit connected to a center point of said half-bridge, wherein the method comprises:
    setting a frequency ($f_{sw}$) of the clocking of the half-bridge by a control unit (2) of the LED converter (10), and
    controlling or regulating the power transmitted by the LED converter (10) to the LED string (6) via the control unit (2), which varies the frequency ($f_{sw}$) of the clocking in a frequency corridor ($f_{opt}$) that is delimited on at least one side, and varies the amplitude of the DC voltage ($V_{bus}$) supplying the resonant converter (1) if at least one of: a change in the load or if a variation of a setpoint value (I*)

for the power would result in a frequency working point outside the frequency corridor ($f_{opt}$) wherein the control unit (2) determines a feedback variable in the resonant converter (1) and sets the frequency (fsw) of the clocking on the basis of the feedback variable, wherein the feedback variable is a variable which reflects the power transmitted by the resonant converter, and wherein the feedback variable is a ratio of a current (Isense) through the resonant converter to a voltage (Vshunt) in the resonant converter (1) or an electrical parameter reflecting said current to voltage ratio.

14. The method as claimed in claim 13, wherein the control unit (2) sets the frequency ($f_{sw}$) of the clocking when the LED converter (10) is switched on in such a way that the frequency working point is in the frequency corridor ($f_{opt}$), and at the same time sets the DC voltage ($V_{bus}$) supplying the resonant converter (1) to a minimum DC voltage.

15. The method as claimed in claim 13, wherein the control unit (2) gradually increases the DC voltage ($V_{bus}$) supplying the resonant converter until a threshold value (ref) for the feedback variable has been reached.

16. The method as claimed in claim 15, wherein the control unit (2) keeps the DC voltage ($V_{bus}$) supplying the resonant converter (1) constant when the threshold value (ref) has been reached.

17. The method as claimed in claim 13, wherein the control unit (2) implements runtime control, detects the feedback variable during the runtime control, and identifies, on the basis of the feedback variable, whether the frequency working point is in the frequency corridor ($f_{opt}$).

18. The method as claimed in claim 17, wherein the control unit (2) adjusts the DC voltage ($V_{bus}$) supplying the resonant converter when a check in respect of the feedback variable during the runtime control establishes that the frequency working point is at least one of: outside the frequency corridor ($f_{opt}$) or would leave the frequency corridor.

19. The method as claimed in claim 13, wherein the control unit (2) is configured to implement the runtime control once the threshold value (ref) has been reached.

20. The method as claimed in claim 13, wherein the control unit (2) sets the DC voltage ($V_{bus}$) supplying the resonant converter (1) by driving a switch of a PFC circuit (4).

21. The method as claimed in claim 13, wherein the control unit (2) communicates a setpoint value ($V_{bus*}$) for the DC voltage ($V_{bus}$) supplying the resonant converter (1) to a PFC circuit (4).

22. The method as claimed in claim 13, wherein a change in the load results from: a change in number; a type of the operated LEDs in the LED string (6); a change in temperature, or combinations thereof.

23. The method as claimed in claim 13, wherein the series/parallel resonant circuit supplies a transformer (3), which provides, at its output on the secondary side, the supply voltage for the LED string (6).

24. The method as claimed in claim 13, wherein a diode circuit feeds a storage capacitor (5) on the secondary side, preferably at an output of the transformer (3), said storage capacitor provides the supply voltage for the LED string (6).

* * * * *